US008342011B2

(12) United States Patent
Galtier et al.

(10) Patent No.: US 8,342,011 B2
(45) Date of Patent: Jan. 1, 2013

(54) METHOD FOR DETERMINING A VALUE REPRESENTATIVE OF THE PRESSURE IN A COMBUSTION CHAMBER OF AN INTERNAL COMBUSTION ENGINE

(75) Inventors: Frédéric Galtier, Montpellier (FR); Roger Rouphael, Toulouse (FR); Jeroen Van-Est, Montgiscard (FR)

(73) Assignee: Continental Automotive France, Toulouse (FR)

( * ) Notice: Subject to any disclaimer, the term of this patent is extended or adjusted under 35 U.S.C. 154(b) by 315 days.

(21) Appl. No.: 12/742,734

(22) PCT Filed: Nov. 18, 2008

(86) PCT No.: PCT/EP2008/009727

§ 371 (c)(1), (2), (4) Date: Aug. 31, 2010

(87) PCT Pub. No.: WO2009/065549

PCT Pub. Date: May 28, 2009

(65) Prior Publication Data

US 2010/0313640 A1 Dec. 16, 2010

(30) Foreign Application Priority Data

Nov. 22, 2007 (FR) .................................... 07 08183

(51) Int. Cl.
*G01M 15/08* (2006.01)

(52) U.S. Cl. .................................................... 73/114.16

(58) Field of Classification Search ............... 73/114.07, 73/114.16, 114.17, 114.22
See application file for complete search history.

(56) References Cited

U.S. PATENT DOCUMENTS

| | | | | |
|---|---|---|---|---|
| 5,419,180 | A | 5/1995 | Yamada et al. | |
| 6,273,064 | B1 * | 8/2001 | Scholl et al. | 123/406.24 |
| 6,408,819 | B1 | 6/2002 | Mezger et al. | |
| 8,108,131 | B2 * | 1/2012 | Huang et al. | 701/110 |
| 2002/0195085 | A1 | 12/2002 | Katagami | |
| 2003/0127073 | A1 | 7/2003 | Buck et al. | |
| 2010/0162803 | A1 * | 7/2010 | Scafati et al. | 73/114.16 |
| 2012/0150414 | A1 * | 6/2012 | Huang | 701/101 |

FOREIGN PATENT DOCUMENTS

| | | | |
|---|---|---|---|
| DE | 39 33 947 | C1 | 1/1991 |
| DE | 197 39 085 | A1 | 3/1999 |
| EP | 1 116 946 | A2 | 7/2001 |
| EP | 1 221 603 | A1 | 7/2002 |
| EP | 1 316 704 | A2 | 6/2003 |
| GB | 2 331 153 | A | 5/1999 |

OTHER PUBLICATIONS

International Search Report, dated Jan. 9, 2009, from corresponding PCT application.

* cited by examiner

*Primary Examiner* — Eric S McCall
(74) *Attorney, Agent, or Firm* — Young & Thompson

(57) ABSTRACT

A method for determining a value representative of the pressure in a combustion chamber of an internal combustion engine, includes the following steps:

i. measuring the vibration level (2) of the internal combustion engine with an accelerometer placed on the engine block of the internal combustion engine, ii. integrating a value from the signal (2) provided by the accelerometer in a window (t1, t2) delimited as a function of the position of the crankshaft of the internal combustion engine, iii. supplying the result of the integration (A1) as a value representative of the pressure, characterized in that the signal (2) provided by the accelerometer in step "i" is integrated while being raised to a power greater than 1 by a predetermined exponent.

3 Claims, 1 Drawing Sheet

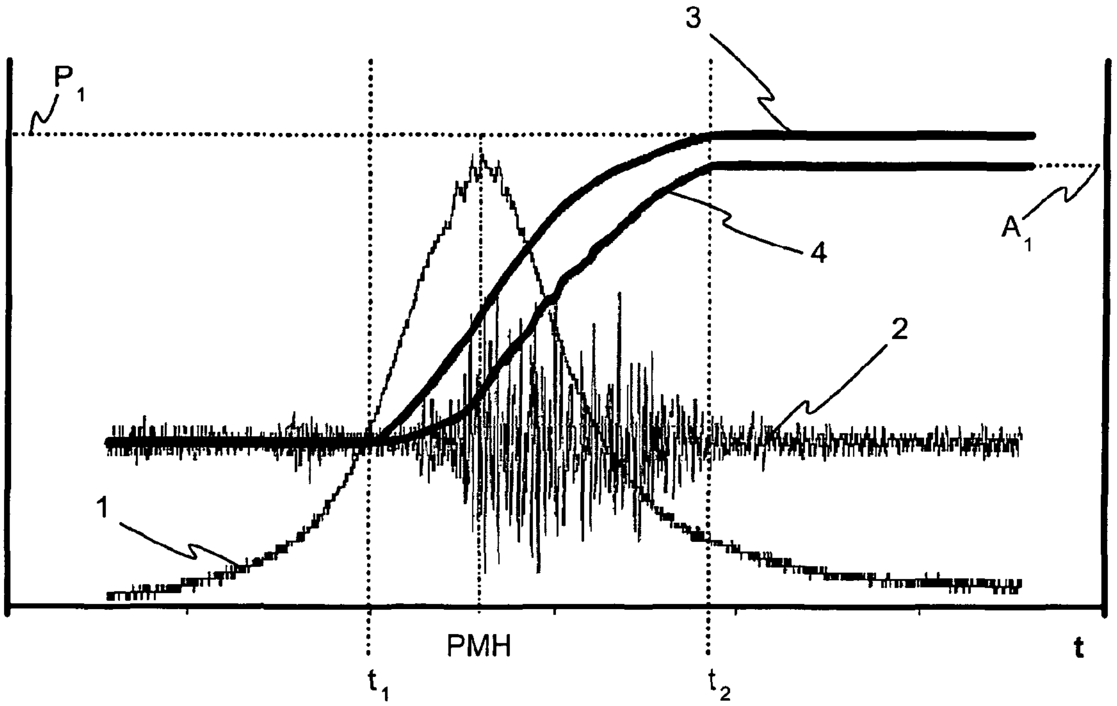
3
P1
A1
4
2
1
PMH
t
t1
t2

METHOD FOR DETERMINING A VALUE REPRESENTATIVE OF THE PRESSURE IN A COMBUSTION CHAMBER OF AN INTERNAL COMBUSTION ENGINE

The invention relates to a method for determining a value representative of the pressure in a combustion chamber of an internal combustion engine.

The value of the pressure inside a combustion chamber of an internal combustion engine may be determined by a measurement, with thanks to a sensor of which one end leads into the combustion chamber. Such a measurement is then used to determine operating conditions of the internal combustion engine by acting on, for example, in the case of a diesel engine, the parameters of fuel injection into the combustion chamber.

The document US 2003/127 073 shows a method for controlling an internal combustion engine which takes account of a pressure measurement in the combustion chamber and which determines the duration of a preinjection in order to achieve a trade-off between a noise level and a particle-emission level.

The document GB 2 331 153 shows a method by which the moment of the beginning of combustion is determined by comparing the measurement provided by a pressure sensor in the combustion chamber and a reference curve.

A pressure sensor in an internal combustion chamber is costly and difficult to install, because of the small amount of space available in modern, compact internal combustion engines.

The object of the invention therefore is to provide a method for determining a value representative of the pressure in a combustion chamber of an internal combustion engine without the use of such a sensor.

Its subject is a method for determining a value representative of a pressure in a combustion chamber of an internal combustion engine, according to which a vibration level of the engine is measured by means of an accelerometer, a value from the signal provided by the accelerometer is integrated and the result of the integration is supplied as a value representative of the pressure.

The inventors have found that there was a very good correlation between the integration of a signal from an accelerometer placed on the internal combustion engine and the integration of the pressure in the combustion chamber. The accelerometer is a sensor that is already widely used to detect the knock phenomenon in spark ignition engines and its cost is low. Thanks to the invention, a value representative of the pressure is obtained that can be used to control or command the internal combustion engine.

Particularly, the integration is carried out in a window determined as a function of the position of the crankshaft of the internal combustion engine. The window is, for example, located during the compression or combustion/expansion phase. The same accelerometer can provide a signal for one or more combustion chambers, by choosing the window in the combustion phase associated with each combustion chamber.

According to the invention, the signal provided by the accelerometer is integrated while being raised to the power by a predetermined exponent. It has been found that the correlation with the integration of the pressure was even better with this calculation method.

Advantageously, the exponent is between 1.8 and 1.85, and preferably is equal to 1.81.

The invention will be better understood and other particular features and advantages will become apparent on reading the following description, the description making reference to FIG. 1 which is a timing chart comparing the measurements of pressure and of acceleration and their respective integrations.

A diesel engine was fitted with a sensor making it possible to measure the pressure inside a combustion chamber. Moreover, an accelerometer of the type used for detecting knock was placed on the engine block of the internal combustion engine.

FIG. 1 represents the recordings over time of the signals supplied by the pressure sensor and by the accelerometer. In particular, the signal 1 represents the pressure in the combustion chamber and the signal 2 represents the accelerometer measurement. The signals extend over a period beginning during a compression phase in the combustion chamber and ending during the combustion/expansion phase, during the same operating cycle. During this period, an injection of fuel into the combustion chamber took place, close to the passing through top dead center TDC of a piston sliding in the combustion chamber.

A computer receiving the signal 2 from the accelerometer carries out integration over time of this signal raised to the power 1.81 during the predefined period between t1 and t2. The curve 4 shows the change in the result of this integration. At the moment t2, the curve 4 has reached a value A1. By comparing A1 with the result P1 of integration over time of the pressure (from the pressure sensor) over the same period, as shown by curve 3, it is found that these values are very similar.

By repeating such measurements and calculations with various engine speeds and various load levels, a correlation between P1 and A1 of between 0.75 and 0.95 is observed.

The integration signal 4 of the signal of the accelerometer can be used to control the fuel injection of the internal combustion engine by changing for example the moment of the beginning of injection of fuel for a preinjection, a main injection and a distribution of the quantities of fuel.

The invention claimed is:

1. A method for determining a value representative of the pressure in a combustion chamber of an internal combustion engine, comprising the following steps:

i. measuring the vibration level (2) of the internal combustion engine by means of an accelerometer placed on the engine block of the internal combustion engine, ii. integrating a value from the signal (2) provided by the accelerometer in a window (t1, t2) delimited as a function of the position of the crankshaft of the internal combustion engine, iii. supplying the result of the integration (A1) as a value representative of the pressure, characterized in that the signal (2) provided by the accelerometer in step "i" is integrated while being raised to a power greater than 1 by a predetermined exponent.

2. The method as claimed in claim 1, wherein the exponent is between 1.8 and 1.85.

3. The method as claimed in claim 2, wherein the exponent is equal to 1.81.

* * * * *